United States Patent
Wu et al.

(10) Patent No.: US 11,812,121 B2
(45) Date of Patent: Nov. 7, 2023

(54) AUTOMATED POST-PRODUCTION EDITING FOR USER-GENERATED MULTIMEDIA CONTENTS

(71) Applicant: WeMovie Technologies, San Ramon, CA (US)

(72) Inventors: Xidong Wu, San Ramon, CA (US); Xiubo Wu, Beijing (CN)

(73) Assignee: WeMovie Technologies, San Ramon, CA (US)

( * ) Notice: Subject to any disclaimer, the term of this patent is extended or adjusted under 35 U.S.C. 154(b) by 0 days.

(21) Appl. No.: 17/517,520

(22) Filed: Nov. 2, 2021

(65) Prior Publication Data

US 2022/0132223 A1     Apr. 28, 2022

Related U.S. Application Data

(63) Continuation of application No. PCT/US2021/056839, filed on Oct. 27, 2021, which
(Continued)

(51) Int. Cl.
*H04N 21/845* (2011.01)
*H04N 21/8543* (2011.01)
(Continued)

(52) U.S. Cl.
CPC ......... *H04N 21/8456* (2013.01); *G06V 20/41* (2022.01); *G11B 27/00* (2013.01); *H04N 21/47205* (2013.01); *H04N 21/8543* (2013.01)

(58) Field of Classification Search
CPC ......... H04N 21/8456; H04N 21/47205; H04N 21/8543; G06V 20/41; G11B 27/00
See application file for complete search history.

(56) References Cited

U.S. PATENT DOCUMENTS 6,466,655 B1    10/2002    Clark
8,244,104 B2    8/2012    Kashiwa
(Continued)

FOREIGN PATENT DOCUMENTS

CA    3038767    10/2019
CN    101316362 A    12/2008
(Continued)

OTHER PUBLICATIONS

International Search Report and Written Opinion dated Mar. 10, 2020 in International Application No. PCT/CN2019/090722, 10 pages.
(Continued)

*Primary Examiner* — Sunghyoun Park
(74) *Attorney, Agent, or Firm* — Perkins Coie LLP

(57) ABSTRACT

Methods, apparatus and systems related to packaging a multimedia content for distribution are described. In one example aspect, a method for performing post-production editing includes receiving one or more footages of an event from at least one user. The method includes constructing, based on information about the event, a script to indicate a structure of multiple temporal units of the one or more footages, and extracting semantic meaning from the one or more footages based on a multimodal analysis comprising at least an audio analysis and a video analysis. The method also includes adding editing instructions to the script based on the structure of the multiple temporal units and the semantic meaning extracted from the one or more footages and performing editing operations based on the editing instructions to generate an edited multimedia content based on the one or more footages.

30 Claims, 10 Drawing Sheets

Related U.S. Application Data is a continuation-in-part of application No. 17/082,941, filed on Oct. 28, 2020, now Pat. No. 11,166,086.

(51) Int. Cl.
*H04N 21/472* (2011.01)
*G11B 27/00* (2006.01)
*G06V 20/40* (2022.01)

(56) References Cited

U.S. PATENT DOCUMENTS

| | | | |
|---|---|---|---|
| 8,560,951 | B1 | 10/2013 | Snyder |
| 8,910,201 | B1 | 12/2014 | Zamiska et al. |
| 9,106,812 | B1 | 8/2015 | Price et al. |
| 9,998,722 | B2 | 6/2018 | Swearingen et al. |
| 10,057,537 | B1 | 8/2018 | MacDonald-King et al. |
| 10,721,377 | B1 | 7/2020 | Wu et al. |
| 11,070,888 | B1 | 7/2021 | Wu et al. |
| 11,107,503 | B2 | 8/2021 | Wu et al. |
| 11,166,086 | B1 | 11/2021 | Wu et al. |
| 11,315,602 | B2 | 4/2022 | Wu et al. |
| 11,321,639 | B1 | 5/2022 | Wu et al. |
| 11,330,154 | B1 | 5/2022 | Wu et al. |
| 11,564,014 | B2 | 1/2023 | Wu et al. |
| 11,570,525 | B2 | 1/2023 | Wu et al. |
| 2002/0099577 | A1 | 7/2002 | Black |
| 2003/0061610 | A1 | 3/2003 | Errico |
| 2003/0225641 | A1 | 12/2003 | Gritzmacher et al. |
| 2006/0053041 | A1 | 3/2006 | Sakai |
| 2006/0251382 | A1 | 11/2006 | Vronay et al. |
| 2006/0282783 | A1 | 12/2006 | Covell et al. |
| 2006/0282785 | A1 | 12/2006 | McCarthy et al. |
| 2007/0099684 | A1 | 5/2007 | Butterworth |
| 2008/0010601 | A1 | 1/2008 | Dachs |
| 2008/0028318 | A1 | 1/2008 | Shikuma |
| 2008/0033801 | A1 | 2/2008 | McKenna et al. |
| 2008/0036917 | A1 | 2/2008 | Pascarella et al. |
| 2008/0101476 | A1 | 5/2008 | Tian et al. |
| 2009/0063659 | A1 | 3/2009 | Kazerouni et al. |
| 2009/0279840 | A1 | 11/2009 | Kudo et al. |
| 2011/0085025 | A1 | 4/2011 | Pace et al. |
| 2011/0162002 | A1 | 6/2011 | Jones et al. |
| 2011/0206351 | A1 | 8/2011 | Givoly |
| 2011/0249953 | A1 | 10/2011 | Suri et al. |
| 2012/0294589 | A1 | 11/2012 | Samra et al. |
| 2013/0067333 | A1 | 3/2013 | Brenneman |
| 2013/0124984 | A1 | 5/2013 | Kuspa |
| 2013/0151970 | A1 | 6/2013 | Achour |
| 2013/0166625 | A1 | 6/2013 | Swaminathan et al. |
| 2013/0167168 | A1 | 6/2013 | Ellis et al. |
| 2013/0177294 | A1* | 7/2013 | Kennberg ............ H04N 21/816 386/E9.011 |
| 2013/0204664 | A1 | 8/2013 | Romagnolo et al. |
| 2013/0232178 | A1 | 9/2013 | Katsambas |
| 2013/0290557 | A1 | 10/2013 | Baratz |
| 2014/0082079 | A1* | 3/2014 | Dunsmuir ........... H04N 21/6581 709/204 |
| 2014/0119428 | A1 | 5/2014 | Catchpole et al. |
| 2014/0132841 | A1 | 5/2014 | Beaulieu-Jones et al. |
| 2014/0133834 | A1 | 5/2014 | Shannon |
| 2014/0242560 | A1 | 8/2014 | Movellan et al. |
| 2014/0328570 | A1* | 11/2014 | Cheng ................ H04N 21/8549 386/241 |
| 2015/0012325 | A1 | 1/2015 | Maher |
| 2015/0043892 | A1 | 2/2015 | Groman |
| 2015/0082349 | A1 | 3/2015 | Ishtiaq et al. |
| 2015/0256858 | A1 | 9/2015 | Xue |
| 2015/0261403 | A1 | 9/2015 | Greenberg et al. |
| 2015/0281710 | A1 | 10/2015 | Sievert et al. |
| 2015/0302893 | A1 | 10/2015 | Shannon |
| 2015/0363718 | A1 | 12/2015 | Boss et al. |
| 2015/0379358 | A1 | 12/2015 | Renkis |
| 2016/0027198 | A1 | 1/2016 | Terry et al. |
| 2016/0050465 | A1 | 2/2016 | Zaheer et al. |
| 2016/0071544 | A1 | 3/2016 | Waterston et al. |
| 2016/0132546 | A1 | 5/2016 | Keating |
| 2016/0292509 | A1 | 10/2016 | Kaps et al. |
| 2016/0323483 | A1 | 11/2016 | Brown |
| 2016/0350609 | A1 | 12/2016 | Mason et al. |
| 2016/0360298 | A1 | 12/2016 | Chalmers et al. |
| 2017/0017644 | A1 | 1/2017 | Accardo et al. |
| 2017/0048492 | A1* | 2/2017 | Buford .................. H04N 7/147 |
| 2017/0169853 | A1 | 6/2017 | Hu et al. |
| 2017/0178346 | A1 | 6/2017 | Ferro et al. |
| 2017/0337912 | A1 | 11/2017 | Caligor et al. |
| 2017/0358023 | A1 | 12/2017 | Peterson |
| 2018/0005037 | A1 | 1/2018 | Smith et al. |
| 2018/0213289 | A1 | 7/2018 | Lee et al. |
| 2019/0045194 | A1* | 2/2019 | Zavesky .............. H04N 19/179 |
| 2019/0058845 | A1 | 2/2019 | MacDonald-King et al. |
| 2019/0075148 | A1* | 3/2019 | Nielsen ............ H04N 21/47217 |
| 2019/0107927 | A1 | 4/2019 | Schriber et al. |
| 2019/0155829 | A1 | 5/2019 | Schriber et al. |
| 2019/0215421 | A1 | 7/2019 | Parthasarathi et al. |
| 2019/0215540 | A1 | 7/2019 | Nicol et al. |
| 2019/0230387 | A1 | 7/2019 | Gersten |
| 2019/0244639 | A1* | 8/2019 | Benedetto ............... G11B 27/11 |
| 2019/0354763 | A1* | 11/2019 | Stojancic ............... G06V 40/20 |
| 2019/0356948 | A1* | 11/2019 | Stojancic ............... G06V 40/20 |
| 2020/0065612 | A1 | 2/2020 | Xu et al. |
| 2020/0081596 | A1 | 3/2020 | Greenberg et al. |
| 2020/0168186 | A1 | 5/2020 | Yamamoto |
| 2020/0213644 | A1 | 7/2020 | Gupta et al. |
| 2020/0312368 | A1 | 10/2020 | Waterman |
| 2020/0327190 | A1 | 10/2020 | Agrawal et al. |
| 2020/0364668 | A1 | 11/2020 | Altunkaynak |
| 2020/0396357 | A1 | 12/2020 | Wu et al. |
| 2021/0011960 | A1 | 1/2021 | Chambon-Cartier |
| 2021/0084085 | A1 | 3/2021 | Jones et al. |
| 2021/0104260 | A1 | 4/2021 | Wu et al. |
| 2021/0152619 | A1* | 5/2021 | Bercovich .......... H04N 21/8547 |
| 2021/0185222 | A1 | 6/2021 | Zavesky et al. |
| 2021/0211779 | A1 | 7/2021 | Wu et al. |
| 2021/0264161 | A1 | 8/2021 | Saraee et al. |
| 2021/0350829 | A1 | 11/2021 | Wu et al. |
| 2021/0398565 | A1 | 12/2021 | Wu et al. |
| 2022/0070540 | A1 | 3/2022 | Wu et al. |
| 2022/0254378 | A1 | 8/2022 | Wu et al. |
| 2023/0041641 | A1 | 2/2023 | Wu et al. |

FOREIGN PATENT DOCUMENTS

| | | |
|---|---|---|
| CN | 101365094 | 2/2009 |
| CN | 101960440 | 1/2011 |
| CN | 104581222 | 4/2015 |
| CN | 108447129 A | 8/2018 |
| CN | 109196371 | 1/2019 |
| CN | 109783659 A | 5/2019 |
| CN | 109905732 | 6/2019 |
| JP | 2000101647 A | 4/2000 |
| WO | 2004105035 A1 | 12/2004 |
| WO | 2008156558 A1 | 12/2008 |
| WO | 2010068175 A2 | 6/2010 |
| WO | 2011004381 A1 | 1/2011 |
| WO | 2014090730 A1 | 6/2014 |
| WO | 2021074721 A2 | 4/2021 |

OTHER PUBLICATIONS

Davenport, Glorianna, et al., "Cinematic primitives for multimedia", MIT Media Laboratory, IEEE Computer graphics and Applications, pp. 67-74, Jul. 1991.

International Search Report and Written Opinion dated May 7, 2020 for International Application No. PCT/CN2019/099534, filed on Aug. 7, 2019 (9 pages).

International Search Report and Written Opinion dated May 27, 2020 for International Application No. PCT/CN2019/109919, filed on Oct. 8, 2019 (11 pages).

International Search Report and Written Opinion dated Aug. 7, 2020 for International Application No. PCT/US2020/032217, filed on May 8, 2020 (10 pages).

(56) References Cited

OTHER PUBLICATIONS

International Search Report and Written Opinion dated Jan. 3, 2022 for International Application No. PCT/US2021/047407, filed on Aug. 24, 2021 (20 pages).
P. Minardi and B. Alonso, "How Automation Can Help Broadcasters and Production Companies Reach Video Production Nirvana," SMPTE17: Embracing Connective Media, 2015, pp. 1-12, doi: 10.5594/M001738. (Year: 2015).
International Search Report and Written Opinion dated Feb. 28, 2022 for International Application No. PCT/US2021/056839, filed on Oct. 27, 2021 (16 pages).
Hua et al., "AVE—Automated Home Video Editing," Proceedings of the 11th ACM International Conference on Multimedia, MM '03, Berkeley, CA, Nov. 2-8, 2003.
Tunikova, Oksana, "Product Placement—A Good Advertising Adaptation?," Business 2 Community, available at https://www.business2community.com/marketing/product-placement-good-advertising-adaptation-02026643.
Extended European Search Report for European Patent Application No. 19932602.6, dated Nov. 25, 2022 (8 pages).
Office Action for Chinese Patent Application No. 201980098650.5, dated Nov. 10, 2022 (15 pages).
International Search Report and Written Opinion dated Apr. 21, 2023 for International Application No. PCT/US2022/081244 (23 pages).

\* cited by examiner

AUTOMATED POST-PRODUCTION EDITING FOR USER-GENERATED MULTIMEDIA CONTENTS

CROSS REFERENCE TO RELATED APPLICATIONS

This patent application is a continuation application of and claims benefits of and priorities to International Patent Application No. PCT/US2021/056839 filed Oct. 27, 2021, which is a continuation-in-part application of U.S. patent application Ser. No. 17/082,941 of the same title by the same inventors, filed on Oct. 28, 2020. The entire content of the before-mentioned patent applications is incorporated by reference as part of the disclosure of this application.

TECHNICAL FIELD

This patent document relates to automated post-production editing of user-generated multimedia contents including audios, videos, or multimedia products that include moving images.

BACKGROUND

User-generated content, also known as user-created content, is content that has been posted by users on online platforms. The advent of user-generated content marks a shift from creating online content by media organizations to providing facilities for amateurs to publish their own content. With the rapid development of mobile devices that are capable of capturing content at a variety of time and places and various social media platforms, the amount of user-generated content has increased at a staggering pace.

SUMMARY

Described herein are techniques, subsystems and systems to allow automated post-production editing of user-generated content, thereby enabling amateur users to easily create professionally edited multiple media contents and to distribute the contents among multiple social media platforms. The disclosed techniques can be used by amateurs to automatically organize captured footages from multiple devices according to a timeline of an event and to produce professionally edited content without the need to understand complex editing commands.

In one example aspect, the disclosed technology can be implemented to provide a computer-implemented method for performing post-production editing includes receiving one or more footages of an event from at least one user. The method includes constructing, based on information about the event, a script to indicate a structure of multiple temporal units of the one or more footages, and extracting semantic meaning from the one or more footages based on a multimodal analysis comprising an audio analysis and a video analysis. The method also includes adding editing instructions to the script based on the structure of the multiple temporal units and the semantic meaning extracted from the one or more footages and performing editing operations based on the editing instructions to generate an edited multimedia content based on the one or more footages.

In another example aspect, the disclosed technology can be implemented to provide a post-production editing platform includes a user interface configured to receive one or more footages of an event from at least one user. The platform also includes one or more processors configured to construct, based on information about the event, a script to indicate a structure of multiple temporal units of the one or more footages. The one or more processors are configured to extract semantic meaning from the one or more footages based on at least an audio analysis and a video analysis of the one or more footages, add editing instructions to the script based on the structure of the multiple temporal units and the semantic meaning extracted from the one or more footages, and perform editing operations based on the editing instructions to generate an edited multimedia content based on the one or more footages.

These, and other, aspects are described in the present document.

DETAILED DESCRIPTION

Figure 1:
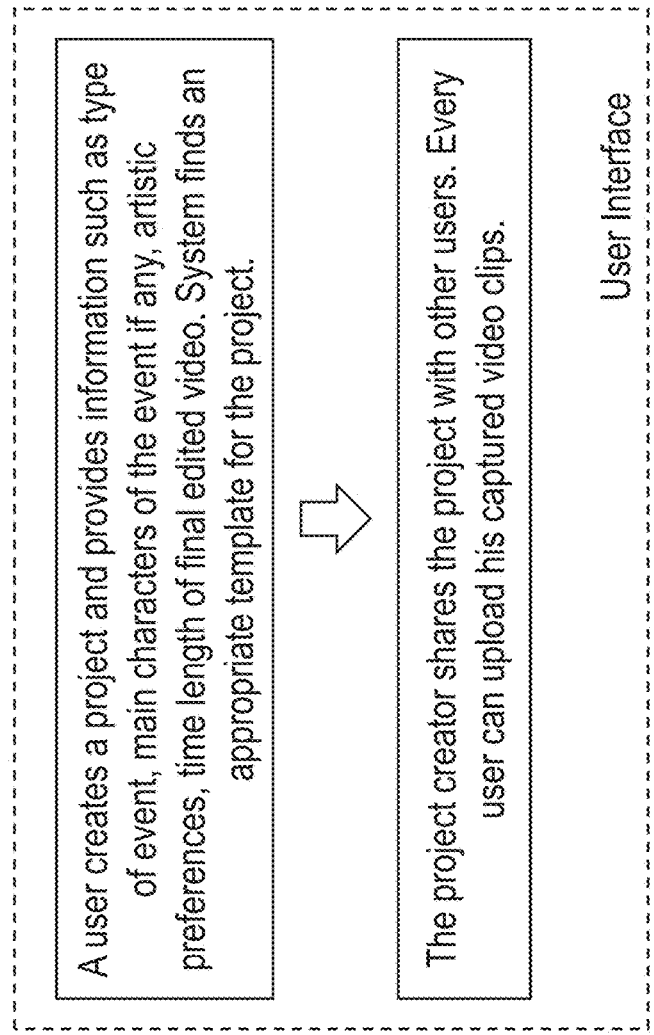
FIG. 1 illustrates an example flow for creating a post-production project using a user interface of an example post-production editing platform in accordance with the present technology.

Rapid development of mobile devices and social media platforms has led to a staggering amount of user-generated contents such as videos and other multimedia materials. Yet, the vast majority of the user-generated contents tends to be poorly edited. For example, many amateur video materials may be edited with only a handful of editing effects and significant improvements may be made by additional editing and enhancements. Unlike professionally produced video materials and multimedia contents, amateur user-generated contents often do not come with a carefully prepared production script or a clear storyline. Often times, individuals capture events from different angles spontaneously, resulting in digital video footages that are neither synchronized nor aligned with one another in some aspect. Various available video editing software for amateurs can be limited in terms of editing functions and performance. Professional video editing software programs are pricey and are complex to use.

Therefore, post-production editing of user-generated contents from multiple sources continues to be a challenge for amateur users for producing good quality armature videos and multimedia materials.

This patent document discloses techniques that can be implemented in various embodiments to allow fully automated post-production editing of user-generated contents, thereby enabling amateur users to create high quality multiple media contents with ease and with a feel of a professionally edited video. The disclosed techniques can be implemented to provide interactive and iterative editing of the contents using simple user interface controls to achieve the editing effects that are desired by the users.

In some embodiments, the disclosed techniques can be implemented as a post-production editing platform that includes one or more of the following subsystems:

1. User Interface: The post-production editing platform provides a user interface that allows users to upload footages captured using one or more devices. Such an user interface may be structured to enable users to provide some basic information about the captured subject matter, such as the type of the event, the number of devices used to capture the data, and the time and/or location of the event. Such user provided basic information can be subsequently used to facilitate the creation of the desired user edited multimedia contents. The user interface can also be configured to enable users to select a desired editing template based on the nature of the event from different editing templates tailored for different types of events. For example, for a wedding event, the platform can provide several post-production editing templates specifically designed for weddings for the users to choose. Alternatively, or in addition, the platform can select a default template to use based on the information provided by the user.

2. Content Reconstruction: Based on the information provided by the user, the Content Reconstruction part of the post-production editing platform performs preliminary content analysis on the footages to determine the scenes and/or shots structure of the footages according to the timeline.

3. Semantic Analysis: After determining the scene and/or shot structure of the footages, the Semantic Analysis part of the platform can further apply semantic analysis to the footages to obtain details of each scene/shot. For example, audio data can be converted to closed caption of the conversations; facial recognition can be performed to identify main roles that appear in the footages. Based on the scene/shot structure and the results of semantic analysis, the platform can construct a script that outlines the storyline, timeline, roles, and devices involved for capturing the raw data.

4. Automated Post-production Editing: Once the script is constructed, post-production editing can be performed fully automatically by the Automated Post-production Editing Module of the platform. For example, based on the template selected by the user, the Automated Post-production Editing module of the platform can modify the generated script to add appropriate editing instructions. Certain scenes and/or shots can be cut while certain artistic effects can be added as transitions between the scenes.

5. Interactive Refinement: The generated script also provides the flexibility of interactive refinement when the user would like to make custom editing changes to the content that are different from what has been defined in the template. The platform can provide an Interactive Refinement module with simple, or intuitive user interface controls to enable the user to modify the editing effects.

6. Packaging and Release: The edited content can be packaged to appropriate format(s) based on the target social media platforms and distributed accordingly.

The post-production editing platform can be implemented as a stand-alone software program or a web service. Details of the above subsystems are further discussed in connection with FIGS. 1-6 below.

FIG. 1 illustrates an example flow 100 for creating a post-production project using a user interface of an example post-production editing platform in accordance with the present technology. The platform can provide a user interface (e.g., a web interface or a user interface on a mobile app) to allow a user to create a post-production editing project. During project creation, the user can indicate the subject matter of the project (e.g., information about the event that has been captured) and upload the footages to the platform. For example, the content can be captured for weddings, reunions, family gatherings, community celebrations, etc. The user can be prompted to provide time and/or location at which the content was captured. Alternatively, or in addition, the post-production editing platform can extract such information from metadata of the footages if the metadata is available.

In some embodiments, the platform can perform a quick facial recognition on part of the footages to identify the main characters involved in the event. For example, if the event involves several main characters (e.g., the bride and the groom in a wedding), the platform can analyze part of the footages to identify the bride and the groom. One way to implement this identification is to provide a user interface that enables the user upload photos of the main characters (e.g., the bride and the groom) to allow the platform to apply facial recognition using the faces in the uploaded photos to correctly identify the characters in the videos. In some embodiments, after the platform identifies several main characters, the user can be prompted to provide or input the name of these identified characters.

In some embodiments, the platform can determine an appropriate template for the project based on the information provided by the user. The template can provide a default storyline, along with a set of background music clips and/or artistic effects. In some embodiments, the user can select a template from a set of available templates. The user can also make changes to the template (e.g., replacing music clips or editing effects) either before any of the processing is performed on the footages or after the footages are edited. For an event that does not have a well-defined structure, there may not be any available template. The user can be prompted to provide a structure. For example, the user can provide descriptions for a list of scenes based on time sequence and different locations of the event.

Once the project is created, the user can also invite other users to participate the project, e.g., inviting friends or family members to the project so that the invited friends or family members can upload additional content captured from different devices. The platform can determine the number of devices used to produce the contents based on the number of user uploads and/or the metadata associated with the footages.

Figure 2:
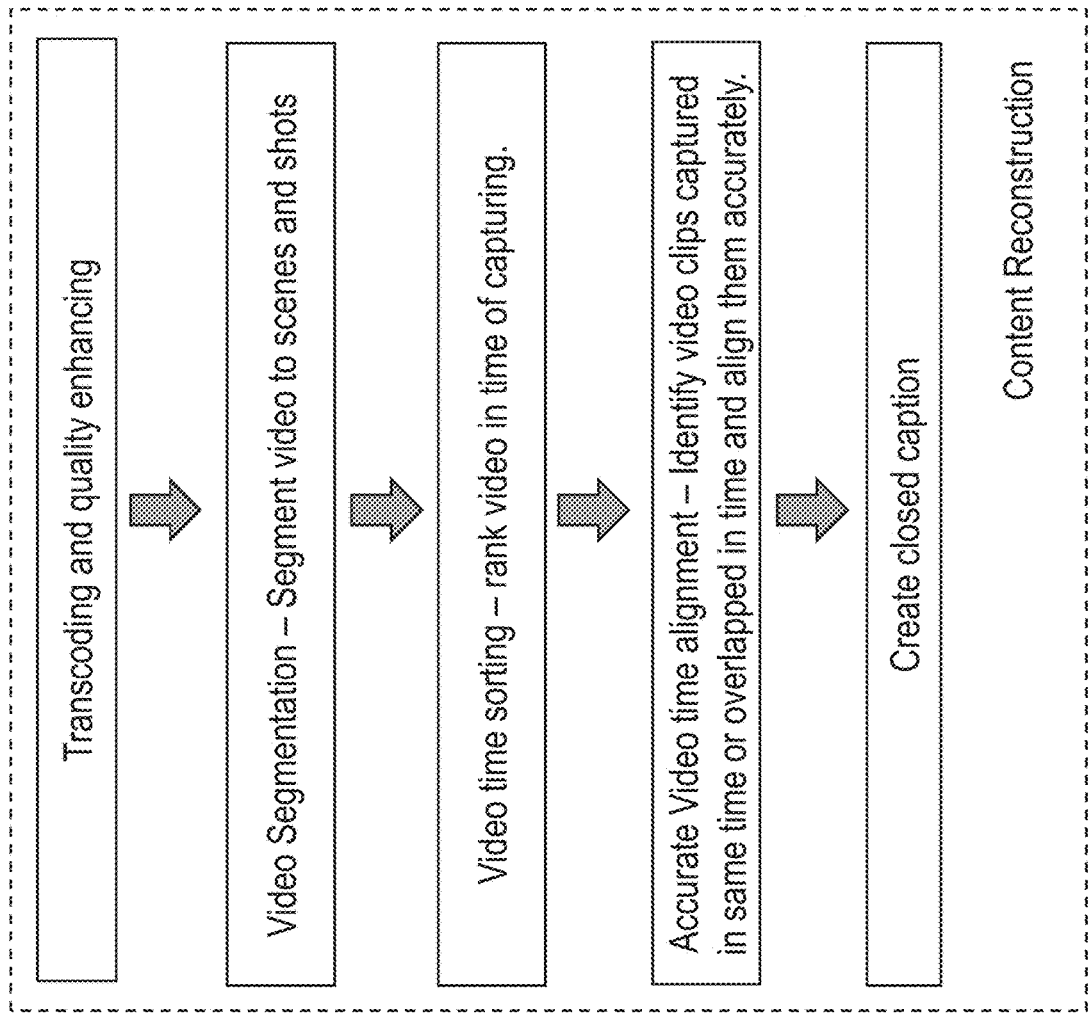
FIG. 2 illustrates an example flow for performing content reconstruction by an example post-production editing platform in accordance with the present technology.

FIG. 2 illustrates an example flow 200 for performing content reconstruction by an example post-production editing platform in accordance with the present technology. As discussed above, the footages can be captured by different users using different devices. Often times, different video codecs and/or different resolutions have been used in producing these footages due to the differences between devices. It is thus necessary to perform transcoding to video footages from difference devices to convert the different video footages into transcoded video footages based the same codecs and/or resolution, so that they can be organized in a uniform manner for the project. The platform can also perform quality enhancement processing steps to reduce and/or remove shaking or jittering artifacts in the videos. In some embodiments, video clips with very poor quality can be discarded by the platform.

As part of the content reconstruction, the platform then performs video segmentation to divide the footages into smaller segments in the temporal unit of shots and/or scenes. A shot is a sequence of frames shot uninterruptedly by one camera. Multiple shots that are produced at the same location and/or time are grouped into a scene. The platform can perform shot transition detection to determine any abrupt or gradual transitions in the content and split the footages into shots. The platform can further adopt different algorithms, such as content-aware detection and/or threshold detection, to determine whether a scene change has occurred so as to group relevant shots in the same scene. A tree-structure that includes multiple scenes, each scene including multiple shots, can be constructed to represent the footages.

Figure 3:
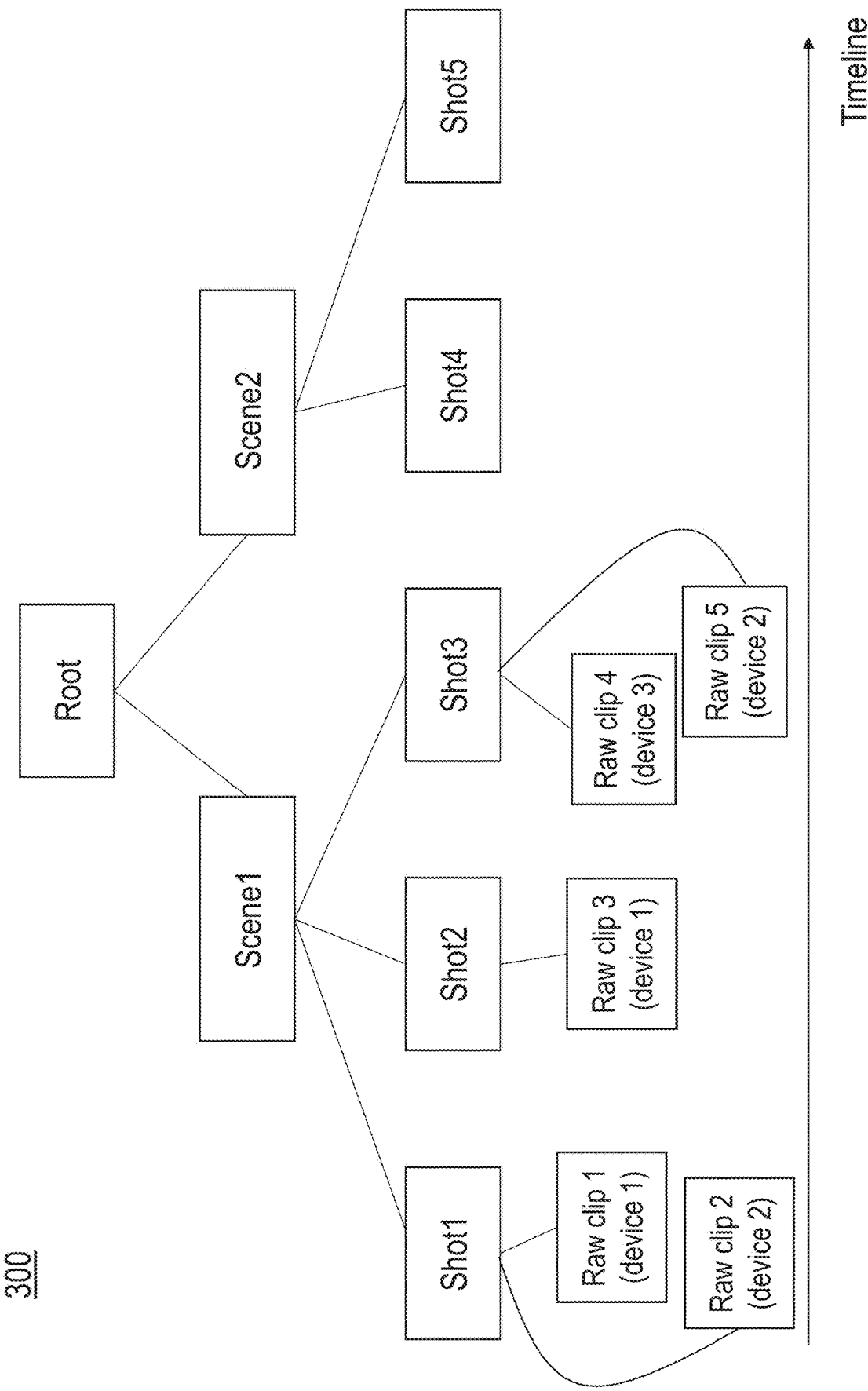
FIG. 3 illustrates an example structure of a footage in accordance with the present technology.

FIG. 3 illustrates an example structure 300 of a footage in accordance with the present technology. In this example, the footage includes two main scenes, each comprising multiple shots. Each of the temporal unit (e.g., shot and/or scene) in the structure can be assigned a time domain value. Based on the metadata included in the footages, as well as the information provided by the user(s), the platform can determine a start time and end time for each of the temporal unit. Different shots and/or scenes in footages provided by different users (or captured by different devices) can be aligned along the time-domain. Shots that have been captured around the same time can be associated with each other. For example, as shown in FIG. 3, raw clip 1 from device 1 and raw clip 2 from device 2 were captured around the same time. The post-production editing platform can also determine that the clips are related to the same content. That is, these are the clips correspond to the same character(s)/moment(s) taken from different devices from different angles. The clips are marked to be associated with the same shot. Similarly, raw clip 4 from device 3 and raw clip 5 from device 2 overlap at least partially in the time domain. They are also different clips that capture the same character(s) and/or moment(s). Thus, both these clips are associated with shot 3.

In some embodiments, the time information provided by the users can be inaccurate. Also, the time information included in the metadata may not match perfectly as the devices were not synchronized. The platform can perform preliminary object/character/gesture recognition to align the shots based on the content of the shots (e.g., when the same character or the same gesture appeared in two different video clips). Furthermore, audio data can be used to align the shots in time domain. When the same sound appears at slightly different time points in different clips, the platform can synchronize the clips and/or shots based on the occurrence of the sound.

The platform can start to build a script based on the preliminary information and time-domain alignment/synchronization. Table 1 shows an example initial script constructed by the post-production editing system corresponding to the structure shown in FIG. 3.

TABLE 1

Example Initial Script

```
<movie>
    <title> Wedding </title>
        <scene id=1>
    <duration unit=minute>15</duration>
    <location>
        <city>San Francisco</city>
        <latitude>120000</latitude>
        <longitude>120000</ longitude>
        <location type>outdoor</location type>
        <address>...</address>
    </location>
    <casts>
        <actor>Groom</actor>
        <actress>Bride</actress>
        ...
    </casts>
    <cameras>
        ...
    </cameras>
    <scene id=1>
    <shot id=1>
        <start time>0:0:0</start time>
        <end time>0:0:16</end time>
        <camera id=1>
          <start time>0:0:2</start time>
          <end time>0:0:16</end time>
          <URL>http://example.com/movies/wedding/sce1-shot1-camera1.mp4</URL>
        </camera>
        <camera id=2>
          <start time>0:0:0</start time>
          <end time>0:0:13</end time>
          <URL>http://example.com/movies/wedding/sce1-shot1-camera2.mp4</URL>
        </camera>
    </shot>
        ...
    <shot id=2>
    </shot>
```

TABLE 1-continued

Example Initial Script

```
    ...
    <shot id=3>
    </shot>
</scene>
...
</movie>
```

As most amateur productions do not have predefined storylines or production scripts, the users lack a clear outline to organize the contents for editing purposes. The script generated by the post-production editing platform offers the users a top-level overview of the contents and the relationships between contents captured by different devices, thereby facilitating subsequent editing operations to be performed on the contents.

Figure 4:
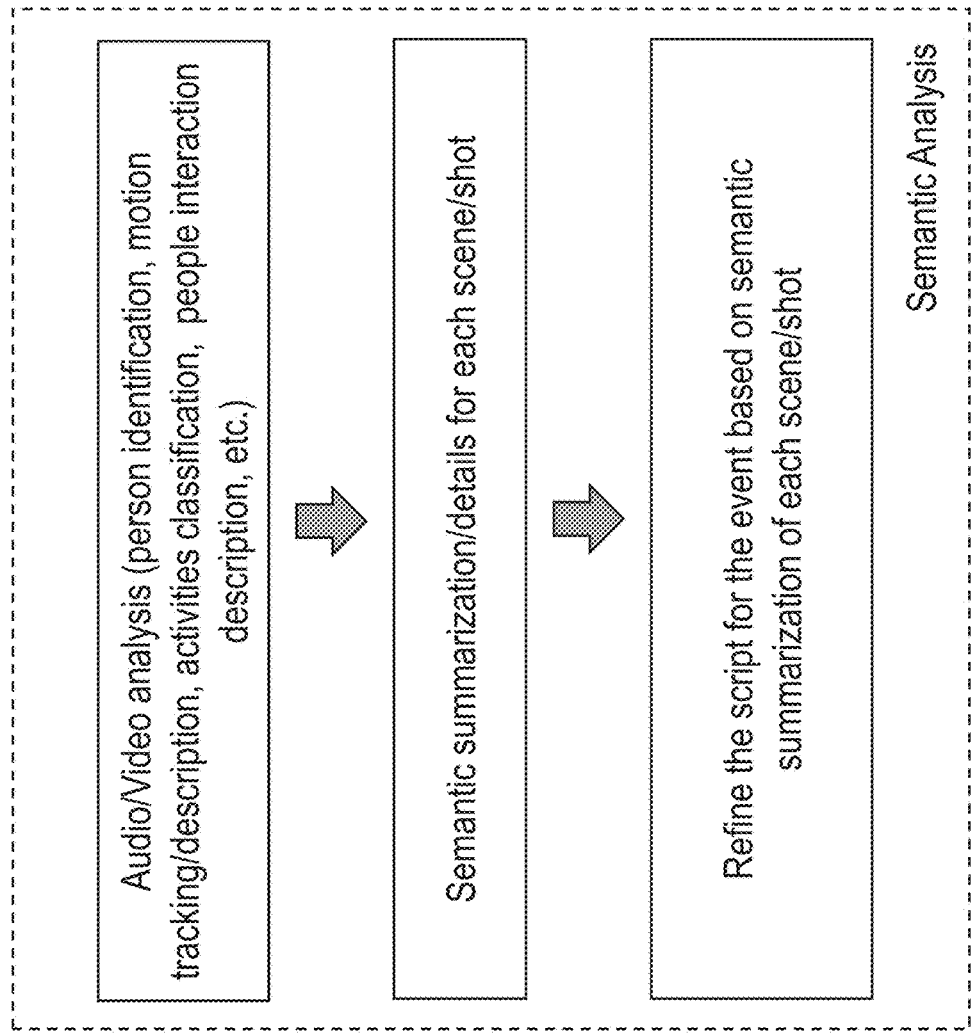
FIG. 4 illustrates an example flow for performing semantic analysis by an example post-production editing platform in accordance with the present technology.

FIG. 4 illustrates an example flow 400 for performing semantic analysis by an example post-production editing platform in accordance with the present technology. Based on the scene/shot structure and preliminary analysis results, the post-production editing platform can perform in-depth semantic analysis of the shots and/or scenes to further identify the roles, classify the activities, track motion or movements performed by the characters, etc. The platform can perform multi-modal analysis (e.g., audio and video) based on Natural Language Processing (NLP) algorithms and machine learning algorithms in computer vision and/or video processing areas to further obtain information about the contents.

For example, audio and text analysis using NLP algorithms can be adopted to classify speech and extract key words. The audio data can be converted into closed caption using voice recognition techniques. Audio analysis can also extract non-verbal information such as applauding, cheering, and/or background music or sound.

In some embodiments, besides the preliminary facial recognition and/or object detection operations, computer vision technologies can be used to identify actions and motions accurately. For example, techniques such as optical flow can be used to track human action and/or object movements. Based on the information provided by the user (e.g., the nature of the events, the location at which the footages were captured, etc.) and the recognized objects/characters, sequential actions that have been identified can be linked to form a semantic context. The shots and/or scenes associated with the actions can then be provided with corresponding semantic labels. For example, given a well-defined scene, such as the vow exchange at a wedding, the actions performed by the characters can be labeled with corresponding semantic meanings with high confidence. For scenes that do not have well-defined structures and/or semantic contexts, the system can indicate that the derived semantic meaning is given a low confidence level. The user can be prompted to refine or improve the semantic labeling of the actions/scenes for those scenes.

In some embodiments, one or more neural networks can be trained to provide more accurate context labeling for scenes/shots. Different domain-specific networks can be used for scenes that are well-defined (e.g., weddings, performances, etc.) as well as scenes that lack well-defined structures (e.g., family picnic). In particular, a recurrent neural network (RNN) is a class of artificial neural networks that form a directed graph along a temporal sequence. In some embodiments, a domain-specific RNN (e.g., for wedding events) can be trained to provide semantic meaning for certain shots/scenes in wedding footages. Another domain-specific RNN (e.g., for picnics) can be trained to label certain shots/scenes in footages that capture family picnics. The RNNs can first be trained offline using a small set of training data with predefined correspondence between actions (e.g., an applause following a speech, a laughter after a joke). Online training can further be performed on the RNNs based on feedback from the user. For example, once the system derives a semantic meaning with a low confidence level, the user can be prompted to provide correction and/or refinement of the semantic meaning. The user input can be used to further train the model to achieve higher accuracy for subsequent processing.

The results of the semantic analysis can be summarized to supplement the initial script generated by the platform. Table 2 shows an example script with semantic information in accordance with the present technology. Additions and/or updates to the initial script based on semantic analysis results are underlined.

TABLE 2

Example Script with Semantic Information

```
<movie>
    <title> Wedding </title>
        <scene id=1>
    <duration unit=minute>15</duration>
    <location>
        <city>San Francisco</city>
        <latitude>120000</latitude>
        <longitude>120000</ longitude>
        <location type>outdoor</location type>
        <address>...</address>
    </location>
    <casts>
        <actor>Groom</actor>
        <actress>Bride</actress>
        ...
    </casts>
```

TABLE 2-continued

Example Script with Semantic Information

```
<cameras>
    ...
</cameras>
<scene id=1>
<shot id=1>
    <start time>0:0:0</start time>
    <end time>0:0:16</end time>
    <action id=1>Bride and Groom walking forward</action>
    <music>
        <id>12</id>
        <type>background</type>
        <action>play</action>
    </music>
    <camera id=1>
        <start time>0:0:2</start time>
        <end time>0:0:16</end time>
        <URL>http://example.com/movies/wedding/sce1-shot1-camera1.mp4</URL>
    </camera>
    <camera id=2>
        <start time>0:0:0</start time>
        <end time>0:0:13</end time>
        <URL>http://example.com/movies/wedding/sce1-shot1-camera2.mp4</URL>
    </camera>
</shot>
    ...
<shot id=3>
    <start time>0:0:16</start time>
    <end time>0:0:20</end time>
    <action id=2>Groom turned to Bride</action>
    <line speaker='Groom'>Today is a beautiful day. </line>
</shot>
    ...
<shot id=4>
</shot>
</scene>
...
</movie>
```

In some embodiments, based on the type of the event, the template can pre-define one or more scenes with corresponding semantic meanings that can be matched to the captured content. For example, for a wedding event, the template can define a default scene for the speech of the groom's father. The scene can come with predefined semantic information. After performing the audio and video analysis, the platform can match the shots and/or clips to the predefined speech scene and update the script accordingly.

Figure 5:
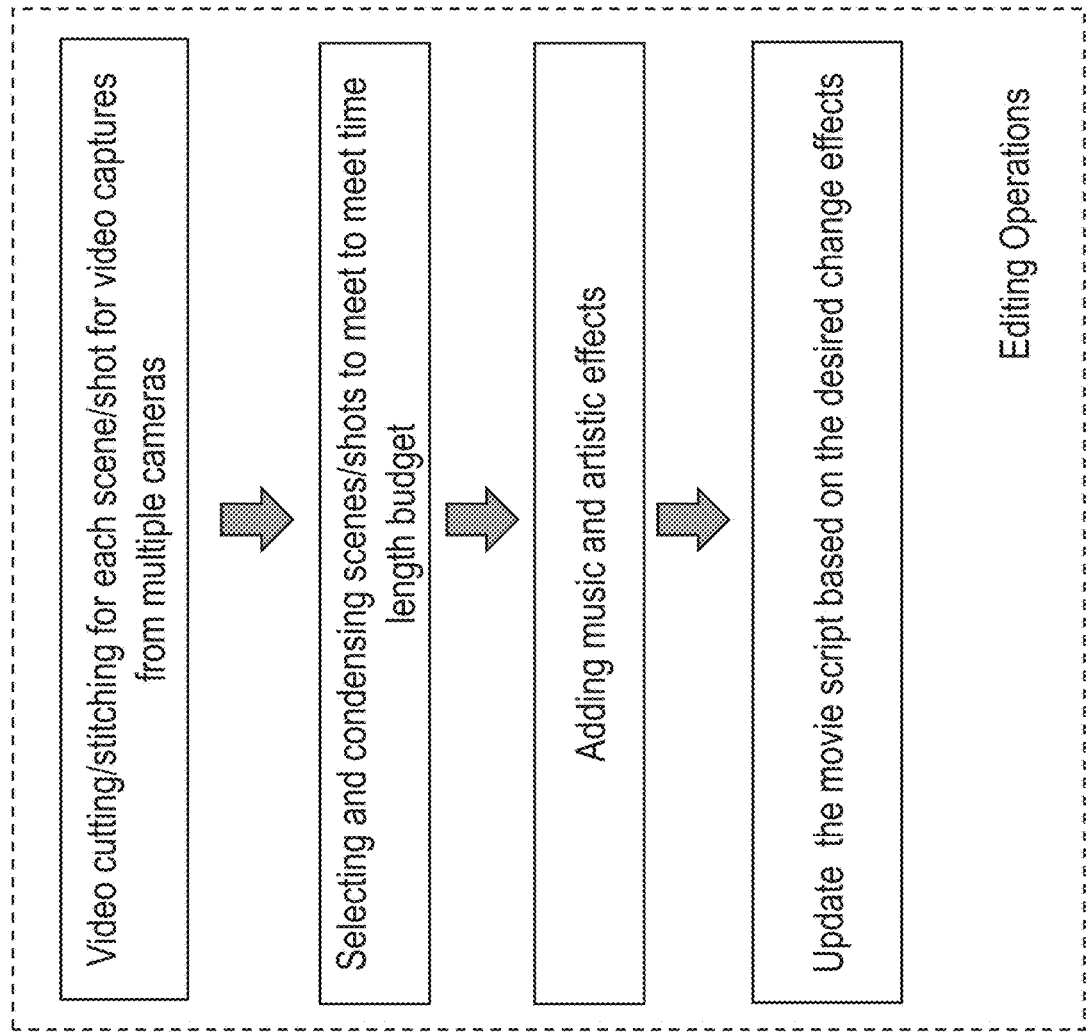
FIG. 5 illustrates an example flow for performing editing operations by an example post-production editing platform in accordance with the present technology.

FIG. 5 illustrates an example flow 500 for performing editing operations by an example post-production editing platform in accordance with the present technology. Given the metadata information for the project and the generated script, the post-production editing platform can further define editing operations, such as shot/scene cutting and/or transitions effects. Appropriate background music can also be added to the footages.

In some embodiments, the script can be further modified to include the editing operations to be performed to the footages. For example, shots can be cut for each scene; multiple clips from different devices can be stitched. In addition to the cutting/editing locations determined based on the template, the post-production editing platform can determine whether there are dramatic changes in the footage indicating "dramatic moments," which can be potential cut positioning to further cut/edit the footage.

In some embodiments, the lengths of the scenes can be adjusted according to the desired length of the entire content. The original background music or sound can be replaced by different sound effects. Transition effects between the scenes can also be added to the script. Table 3 shows an example script with editing operations in accordance with the present technology. The example changes to the script and editing operations are underlined in Table 3. Based on information in the script, the platform performs editing of the footages accordingly.

TABLE 3

Example Script with Editing Operations

```
<movie>
    <title> Wedding </title>
    <scene id=1>
    <transition>fade in</transition>
    <duration unit=minute>15</duration>
    <location>
        <city>San Francisco</city>
        <latitude>120000</latitude>
        <longitude>120000</ longitude>
        <location type>outdoor</location type>
```

TABLE 3-continued

Example Script with Editing Operations

```
            <address>...</address>
        </location>
        <casts>
            <actor>Groom</actor>
            <actress>Bride</actress>
            ...
        </casts>
        <cameras>
            ...
        </cameras>
        <scene id=1>
        <shot id=1>
            <start time>0:0:0</start time>
            <end time>0:0:16</end time>
            <action id=1>Bride and Groom walking forward</action>
            <music>
                <id>16</id>
                <type>romantic</type>
                <action>play</action>
            </music>
            <camera id=1>
                <start time>0:0:2</start time>
                <end time>0:0:16</end time>
                <URL>http://example.com/movies/wedding/sce1-shot1-camera1.mp4</URL>
            </camera>
            <camera id=2>
                <start time>0:0:0</start time>
                <end time>0:0:13</end time>
                <URL>http://example.com/movies/wedding/sce1-shot1-camera2.mp4</URL>
            </camera>
            <cut type='match'>camera 2</cut>
        </shot>
        ...
        <shot id=3>
            <start time>0:0:16</start time>
            <end time>0:0:20</end time>
            ...
            <action id=2>Groom turned to Bride</action>
            <line speaker='Groom'>Today is a beautiful day. </line>
            <cut type='jump'>camera 2</cut>
        </shot>
        ...
        <shot id=4>
        </shot>
        <transition>dissolve</transition>
    </scene>
    ...
</movie>
```

Figure 9:
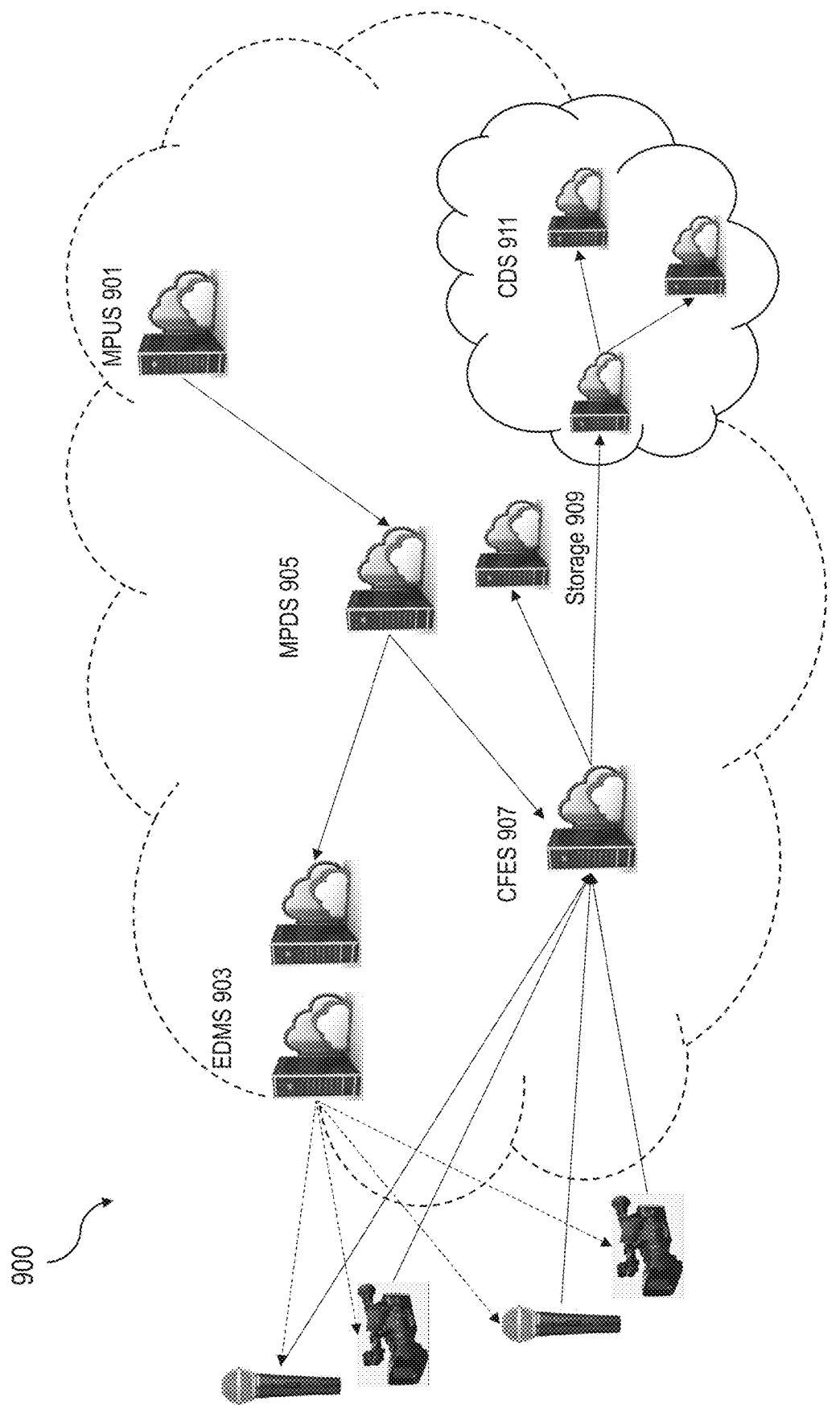
FIG. 9 illustrates an example architecture of a movie production system in accordance with one or more embodiments of the present technology.
Figure 10:
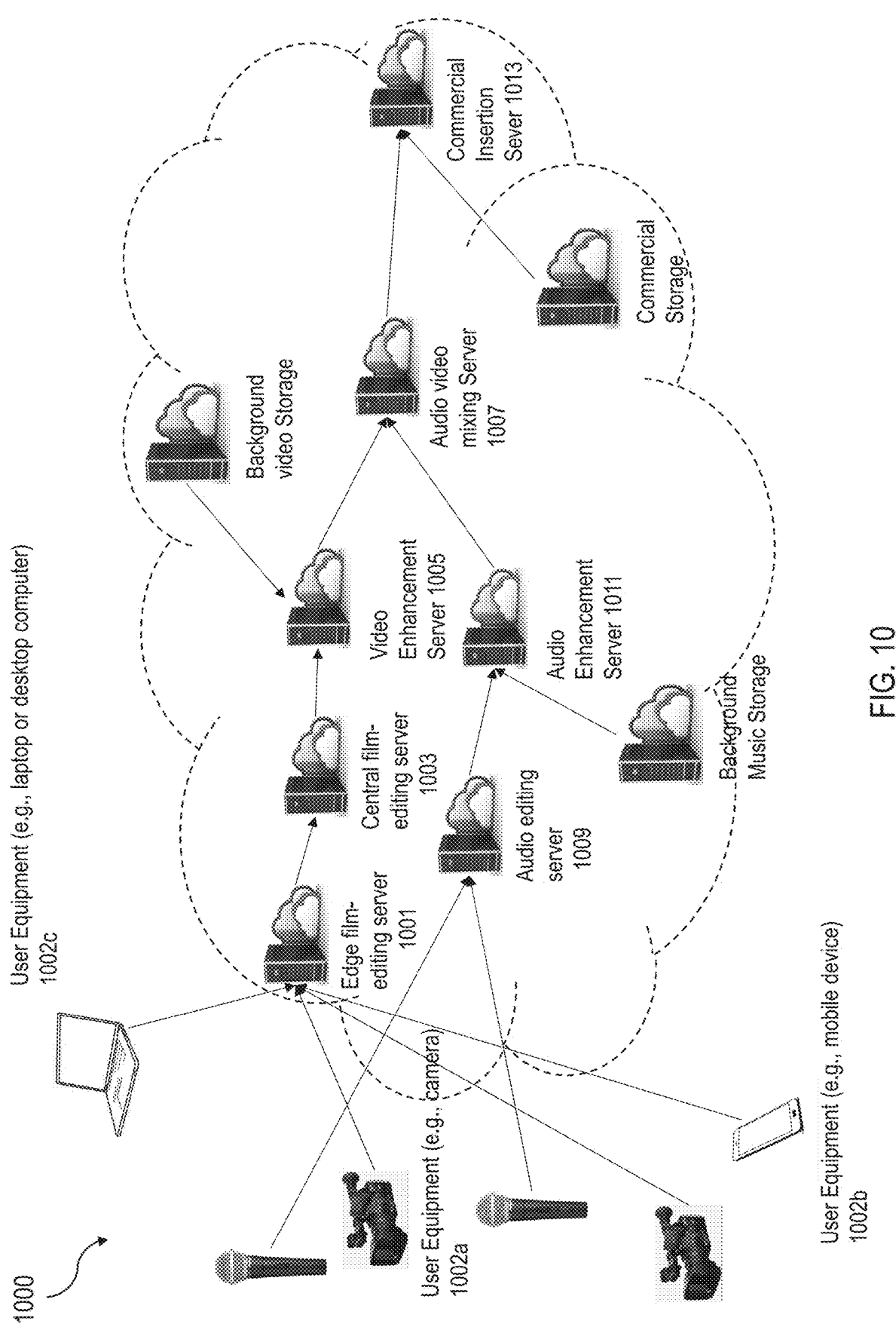
FIG. 10 illustrates an example distributed architecture of a post-production editing system in accordance with the present technology.

In some embodiments, the platform can implement a cloud-based film editing system (CFES) to perform a range of editing operations in a fully automated multimedia editing platform to enable automatic editing according to a storyline that is represented as a machine-readable script. Such a CFES system can be implemented in various configurations where computer servers or parts or components of the CFES system may be geographically or physically located at different regions or locations to enable users of the CFES system to send captured videos to the CFES system for editing at any user location where there is an internet access to the CFES system and retrieve the CEFS-edited video. FIGS. 9 and 10 show two examples. A user of the CFES system may be located in one location while one or more of computer servers or parts or components of the CFES system may be in a different region (e.g., in a foreign country in some system deployments).

As a specific example, FIG. 9 illustrates an example of a movie production system 900 in implementing the disclosed technology in this patent document. The movie production system example 900 includes four main sub-systems: Movie Pre-production User Service (MPUS) 901, End Devices Management System (EDMS) 903, Movie Production Directing System (MPDS) 905, and Cloud-based Film Editing System (CFES) 907. The movie production system 900 can also include digital storage for storing digital data for the movie production and additional storage 909 to store movie data. The system 900 can further include a Content Delivery System (CDS) 911 to provide real-time or quasi-real-time distribution of the content to directly to consumers (e.g., on a payment basis or on a subscription basis) or to on-line movie and TV programing service providers (e.g., Netflix) which use their service platforms to deliver the movies to their customers.

The MPUS 901 provides a user interface that guides users to work through the pre-production process. Based on the genre or visual style of the film, the MPUS 901 can generate machine-readable scripts for the scenes and determine a preliminary production schedule for the user. The MPDS 905 serves as a role of the director in an automated film production. The scripts generated by the MPUS 901 are loaded into the MPDS 905 for further processing. Based on the geographical locations of the scenes/shots, the required equipment, and the personnel involved, the MPDS 905 can determine dependencies and/or constraints among various scenes. During the production time, the MPDS 905 can accurately determine the start time and the duration of each shot and each scene and make adjustment accordingly. The EDMS 903 is a proxy server which receives instructions from MPDS 905 and relay the instructions to all end devices and personnel during the film shooting. The EDMS 903 can be used to provide device registration, device control, device synchronization, device tracking, and encoding support for the production of the content. The CFES 907 carries out most of post-production activities in an automated way; it can either operate on all multimedia contents after the film shooting is completed or operate in real-time on multimedia contents streamed from end devices while content being captured at the scene. In various implementations, the CFES can be designed to provide film editing, audio editing, multimedia quality enhancement and commercial insertion.

The movie production system 900 can be offered to a user as a complete system for production of a movie or TV show; while in other implementations, one or more of the subsystems in the system 900 can be accessed by a user to facilitate part of a particular production of a movie or a TV show. For example, the CFES 907 implemented using the disclosed techniques can be an integrated or an independent post-production editing system available to users. The CFES 907 includes one or more processors and one or more memories including processor executable code. The processor executable code, upon execution by the one or more processors, is operable to configure the one or more processors to receive one or more machine-readable scripts corresponding to one or more scenes of a storyline. The one or more machine-readable scripts include information about multimodal data and editing instructions for each of the one or more scenes. The one or more processors are configured to receive multiple streams of multimedia content corresponding to the one or more scenes, identify at least one change in an audio or video feature in the multiple streams of multimedia content based on the multimodal data for each of the one or more scenes, edit the multiple streams of multimedia content based on the editing instructions and selectively based on the identified change, and generate a final stream of multimedia content based on the edited multiple streams. Details regarding the CFES are further described in International Application No. PCT/US2020/032217, entitled "Fully Automated Post-Production Editing for Movies, TV Shows, and Multimedia Contents," filed on May 8, 2020, which is incorporated by reference by its entirety.

In some embodiments, prior to the content being distributed to various social media platforms, the user may desire to make additional changes to the editing effects. At this stage, the user can be presented with the complete script, which includes the editing instructions as well as the structure of the content. The script also shows how different clips/shots are interrelated to form the edited content. The user now has the option to use simple user interface controls (e.g., selections between different transition types, selections between different angles of the footages) to modify the editing effects without the need to possess professional knowledge about video editing or software programs. The platform can provide a revised version of the edited content based on control input so that the editing operations can be performed in an interactive and iterative manner. In some embodiments, instead of using the provided user interface controls, the user can manually edit the script to incorporate the desired editing effects. The system updates the edited content according to the changes in the script to provide timely feedback to the user.

Figure 6:
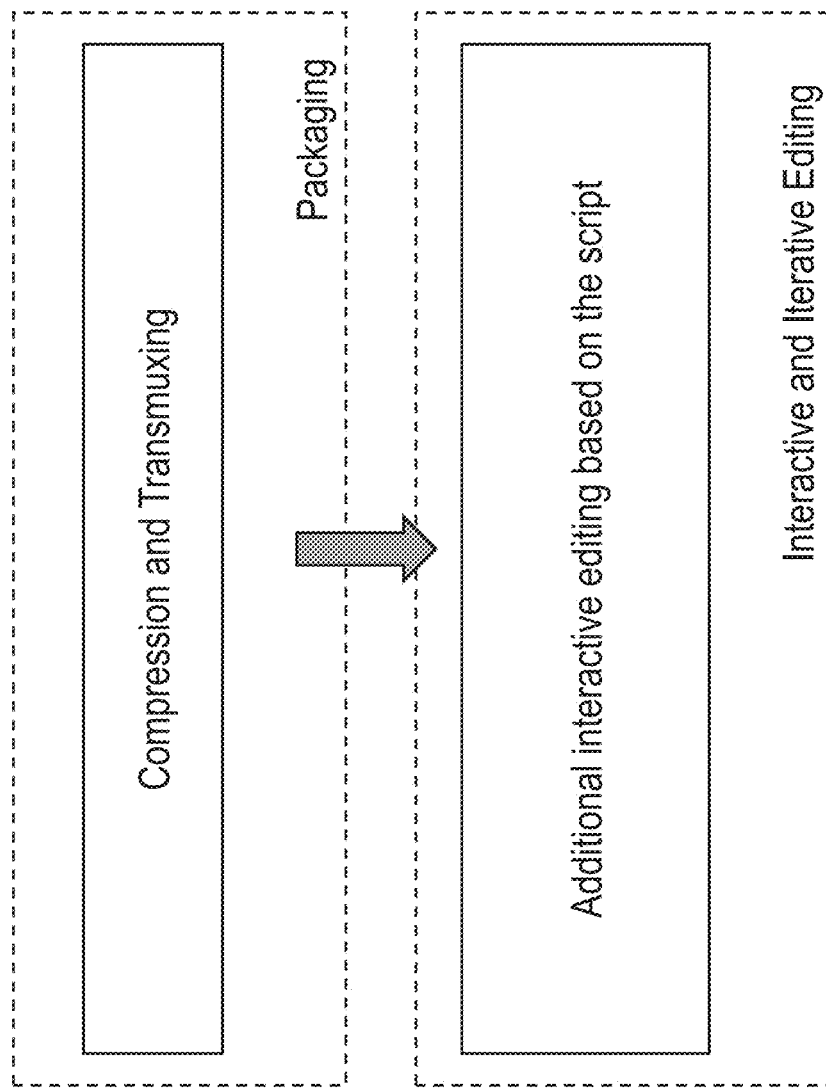
FIG. 6 illustrates an example flow for performing packaging and distribution by an example post-production editing platform in accordance with the present technology.

Once the footages are edited, the edited content can be packaged and distributed to a target platform. FIG. 6 illustrates an example flow 600 for performing packaging and distribution by an example post-production editing platform in accordance with the present technology. The edited multimedia content can be encoded into different formats, such as Flash (.f4v), Moving Picture Experts Group (MPEG) 4 (mp4), or QuickTime (.mov). To facilitate distribution of the edited convents on various online social media platforms, techniques such as adaptive streaming are used to maximize viewing experiences by applying different compression levels according to network conditions. Transmuxing can also be performed to package the compression encoded media stream into a container for online streaming. Because the post-production editing system has constructed a script based on the structure and the semantic meaning of the footages, content structure aware packaging can be performed on the edited contents. For example, with the assistance from the production stage information, produced content can be edited and packaged differently to allow viewers to have completely different viewing experiences of movies, TV shows or videos. Content providers can have the flexibility to create custom versions of the movies, TV shows, or other contents suitable for various viewer groups (e.g., based on viewer subscription plans). Furthermore, content providers can have better control of commercial placement in the movies, TV shows, or other contents to provide seamless viewing experience to the viewers. Details regarding content-structure-aware packaging and distribution can be found in U.S. patent application Ser. No. 17/004,383, entitled "Content Structure Aware Multimedia Streaming Service for Movies, TV Shows and Multimedia Contents," filed on Aug. 27, 2020 and granted as U.S. Pat. No. 11,070,888 B1, which is incorporated by reference by its entirety.

Figure 7:
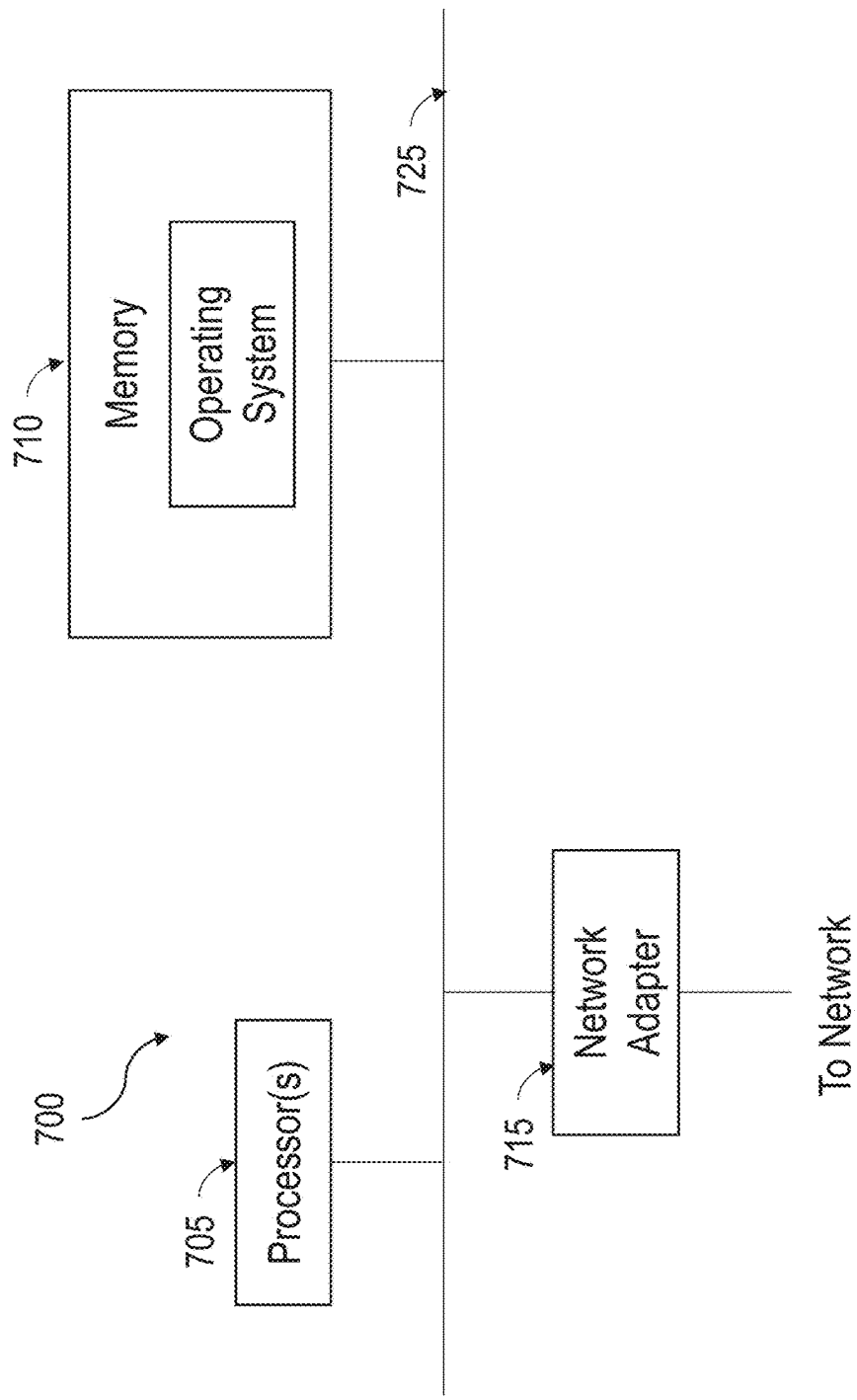
FIG. 7 is a block diagram illustrating an example of the architecture for a computer system or other control device that can be utilized to implement various portions of the presently disclosed technology.

FIG. 7 is a block diagram illustrating an example of the architecture for a computer system or other control device 700 that can be utilized to implement various portions of the presently disclosed technology (e.g., processor(s) to perform transcoding or transmuxing). The computer system 700 includes one or more processors 705 and memory 710 connected via an interconnect 725. The interconnect 725 may represent any one or more separate physical buses, point to point connections, or both, connected by appropriate bridges, adapters, or controllers. The interconnect 725, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 705 may include central processing units (CPUs) to control the overall operation of, for example, the host computer. In certain embodiments, the processor(s) 705 accomplish this by executing software or firmware stored in memory 710. The processor(s) 705 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 710 can be or include the main memory of the computer system. The memory 610 represents any suitable form of random access memory (RAM), read-only memory (ROM), flash memory, or the like, or a combination of such devices. In use, the memory 710 may contain, among other things, a set of machine instructions which, when executed by processor 705, causes the processor 705 to perform operations to implement embodiments of the presently disclosed technology.

Also connected to the processor(s) 705 through the interconnect 725 is a (optional) network adapter 715. The network adapter 715 provides the computer system 700 with the ability to communicate with remote devices, such as the storage clients, and/or other storage servers, and may be, for example, an Ethernet adapter or Fiber Channel adapter.

Figure 8:
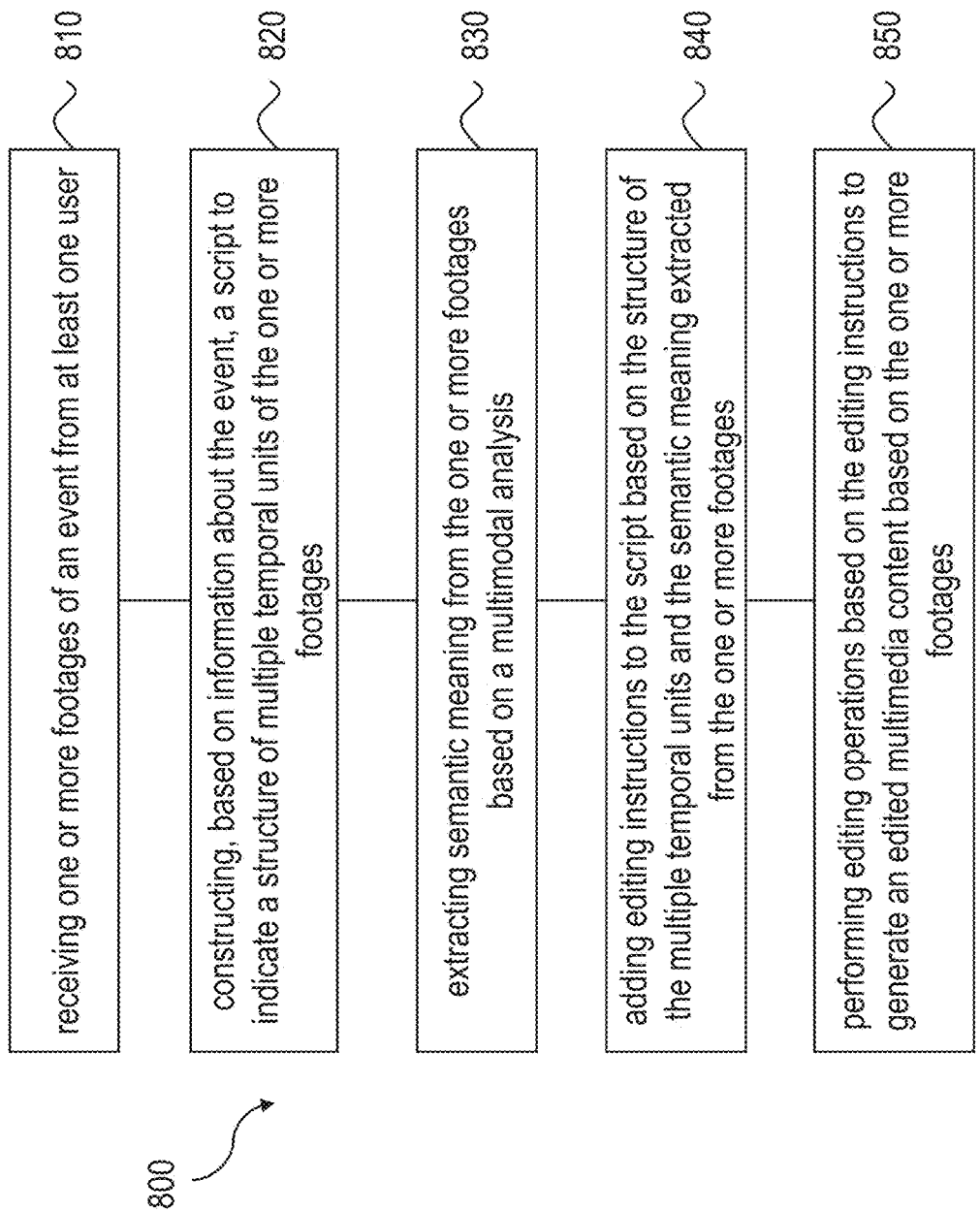
FIG. 8 is a flowchart representation of a method for performing post-production editing in accordance with the present technology.

FIG. 8 is a flowchart representation of a method 800 for performing post-production editing in accordance with the present technology. The method 800 includes, at operation 810, receiving one or more footages of an event from at least one user. The method 800 includes, at operation 820, constructing, based on information about the event, a script to indicate a structure of multiple temporal units of the one or more footages. Here, a temporal unit can include a shot or a scene. The method 800 includes, at operation 830, extracting semantic meaning from the one or more footages based on a multimodal analysis comprising at least an audio analysis and a video analysis. The method 800 includes, at operation 840, adding editing instructions to the script based on the structure of the multiple temporal units and the semantic meaning extracted from the one or more footages. The method 800 also includes, at operation 850, performing editing operations based on the editing instructions to generate an edited multimedia content based on the one or more footages.

In some embodiments, the method includes presenting, to a user via a user interface, the script and the edited multimedia content; receiving input from the user via the user interface to update at least part of the script; and generating a revised version of the edited multimedia content based on the updated script in an iterative manner.

In some embodiments, the method includes extracting information about time or location at which the event has been captured based on metadata embedded in the one or more footages. In some embodiments, the structure of the multiple temporal units specifies that a scene includes multiple shots, and one or more clips from at least one device correspond to a same shot. In some embodiments, the method includes assigning a time domain location for each of the multiple temporal units of the one or more footages and aligning corresponding temporal units based on the time domain location. In some embodiments, the method also includes identifying one or more characters or one or more gestures in the one or more footages and refining the aligning of the corresponding temporal units based on the identified one or more characters or the identified one or more gestures.

In some embodiments, the method includes extracting text or background sound from the one or more footages based on the audio analysis and modifying the script to include the extracted text or the background sound. In some embodiments, the method includes replacing the background sound using an alternative sound determined based on the semantic meaning of the one or more footages.

In some embodiments, the semantic meaning comprises an association between some of the one or more characters that is determined based on the video analysis of the one or more footages. In some embodiments, the method includes packaging the edited multimedia content based on a target online media platform and distributing the packaged multimedia content to the target online media platform.

FIG. 10 illustrates an example distributed architecture of a post-production editing system 1000 in accordance with the present technology. In this system 1000, some of the film-editing functions can be performed by one or more edge film-editing servers 1001. For example, video footages for scenes shot in a particular location by particular equipment (e.g., a digital video camber 1002*a*, or a device with a camera such as a smartphone or tablet 1002*b*, etc.) can be sent to the edited by a corresponding edge film-editing server positioned close to the location. Video footages stored at a user device such as a laptop or desktop computer 1002*c* may also be sent by the user to the post-production editing system 1000 for editing. The edited video footages can then be retrieved by a user using a user device such as a smartphone, a tablet, a laptop or desktop computer for viewing or further processing. The proximity between the edge editing server 1001 and the scene location allows preliminary editing to be completed without much network delay. The edge servers are especially important if the movie is being broadcasted in near real time or shortly after completion of the final movie editing. For non-real time post production editing, such edge servers may not be necessary since all recorded multimedia contents will be gathered to a single cloud location for processing. The edited footages from the edge film-editing serves can be consolidated by the central film-editing server 1003 for further processing (e.g., editing across scenes in multiple locations). The fully edited footage is then sent to the video enhancement server 1005 for performing compression and other enhancements before being mixed with edited audio stream from the audio editing server 1009 and the audio enhancement server 1011. Once the enhancements are completed, the commercial insertion server 1013 replaces selected portion of the footage with desired commercial content. The commercial insertion server 1013 can also take footages with existing commercial content and replace them with another brand. It is noted that each block in FIG. 10 represents a logic functional entity instead of a physical entity. Logical entities can be combined into one physical entity or separated into different entities based on cost, technological, networking and scale considerations. The data flow from one physical entity to another can be streaming for real time processing and or can be batch transport for offline processing.

In operation, the post-production editing system 1000 may be connected as part of a multimedia content system or be accessed by users for performing desired post-production editing operations. Such a multimedia content system can include an input device that comprises at least a camera (e.g., 1002*a* and/or 1002*b*) as shown in FIG. 10) configured to capture one or more footages of an event. The system can also include one or more computer processors, computer servers or computer storage devices in communication with the input device via a network (e.g., the edge film-editing server 1001, central film-editing server 1003, audio editing server 1009, etc.). The processors, servers and/or devices are configured to receive the one or more footages of the event from the input device and construct, based on information about the event, a script to indicate a structure of multiple temporal units (e.g., shots or scenes) of the one or more footages. The processors, servers and/or devices are configured to extract semantic meaning from the one or more footages based on at least an audio analysis and a video analysis of the one or more footages, add editing instructions to the script based on the structure of the multiple temporal units and the semantic meaning extracted from the one or more footages, perform editing operations based on the editing instructions to generate an edited multimedia content based on the one or more footages, and provide, via the network, the edited multimedia content to one or more multimedia viewing devices to be viewed. In some embodiments, the one or more multimedia viewing devices (such as a user mobile device 1002b shown in FIG. 10) can also be the input device.

The above examples demonstrate that the techniques and systems disclosed in this patent document can be adopted widely to produce professionally edited multimedia contents based on user-captured content using multiple devices. Instead of performing a one-stop automated editing operation, the disclosed system aims to reconstruct a professional production structure (e.g., a reconstructed production script) from raw UGC contents so as to enable content editing at the professional level. The reconstructed script allows the users to quickly understand the correspondence between the shot/scene, the editing effects, and different media files, thereby enabling the users to iteratively make appropriate editing choices if so desired.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, machine-readable script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A computer-implemented method for performing post-production editing of digital video footages or digital multimedia footages, comprising:
receiving multiple footages of an event captured by different devices;
constructing a script to indicate a structure of multiple temporal units of the multiple footages based on information about the event, including a captured time of each of the multiple footages at the event, wherein a temporal unit comprises a shot or a scene, the constructing comprises:
determining the captured time for each of the multiple footages based on metadata associated with each footage;

assigning a time domain location to each of the multiple temporal units of the multiple footages using the captured time; and aligning the multiple footages based on the time domain location of each of the multiple temporal units of the multiple footages such that temporal units captured around a same time are grouped together in the script; and refining the structure of the multiple temporal units of the multiple footages based on semantic meaning extracted from the multiple footages using a multi-modal analysis comprising an audio analysis and a video analysis;

adding editing instructions to the script based on the structure of the multiple temporal units to enable a transition between at least two of the temporal units captured around the same time; and performing editing operations based on the editing instructions to generate an edited multimedia content corresponding to the multiple footages.

2. The method of claim 1, comprising:

presenting, to a user via a user interface, the script and the edited multimedia content;

receiving input from the user via the user interface to update at least part of the script in response to the input from the user; and generating a revised version of the edited multimedia content based on the updated script in an iterative manner.

3. The method of claim 1, comprising:

extracting information about time or location at which the event has been captured based on metadata embedded in the multiple footages captured by the different devices.

4. The method of claim 1, comprising:

identifying one or more characters or one or more gestures in the multiple footages; and refining the aligning of the multiple footages based on the identified one or more characters or the identified one or more gestures.

5. The method of claim 4, wherein the semantic meaning comprises an association between locations of the one or more characters or actions performed by some of the one or more characters that is determined based on the video analysis of the multiple footages.

6. The method of claim 1, comprising:

extracting text or background sound from the multiple footages based on the audio analysis; and modifying the script to include the text or the background sound.

7. The method of claim 6, further comprising:

replacing the background sound using an alternative sound determined based on the semantic meaning of the multiple footages.

8. The method of claim 1, wherein the semantic meaning is extracted based on:

identifying one or more characters in the multiple footages;

identifying, based on the multiple footages, one or more actions performed by the one or more characters; and establishing, using a neural network, an association between at least part of the one or more actions based on the information about the event.

9. The method of claim 8, wherein the semantic meaning is extracted further based on:

adjusting the association between the at least part of the one or more actions using feedback from a user.

10. The method of claim 8, comprising:

packaging the edited multimedia content based on a target online media platform; and distributing the packaged multimedia content to the target online media platform.

11. The method of claim 1, wherein the assigning the time domain location to each of the multiple temporal units of the multiple footages is based on metadata or audio data in the multiple footages.

12. The method of claim 1, wherein the assigning the time domain location to each of the multiple temporal units of the multiple footages further comprises:

determining that multiple temporal units of the multiple footages are captured from different angles around same time.

13. A post-production editing platform, comprising:

a user interface configured to receive multiple footages of an event from multiple users; and one or more processors configured to:

construct a script to indicate a structure of multiple temporal units of the multiple footages based on information about the event, including a captured time of each of the multiple footages at the event, wherein a temporal unit comprises a shot or a scene, wherein the one or more processors are configured to construct the script by;

determining the captured time for each of the multiple footages based on metadata associated with each footage;

assigning a time domain location to each of the multiple temporal units of the multiple footages using the captured time; and aligning the multiple footages based on the time domain location of each of the multiple temporal units of the multiple footages such that temporal units captured around a same time are grouped together in the script; and refining the structure of the multiple temporal units of the multiple footages based on semantic meaning extracted from the multiple footages using at least an audio analysis and a video analysis of the multiple footages;

add editing instructions to the script based on the structure of the multiple temporal units to enable a transition between at least two of the temporal units captured around the same time; and perform editing operations based on the editing instructions to generate an edited multimedia content corresponding to the multiple footages.

14. The post-production editing platform of claim 13, wherein the user interface is configured to present the script and the edited multimedia content to a user, the user interface further configured to receive input from the user to update the script, and wherein the one or more processors are configured to generate a revised version of the edited multimedia content based on the updated script to enable iterative editing of the multiple footages by the user.

15. The post-production editing platform of claim 13, wherein the one or more processors are configured to extract information about time or location at which the event has been captured based on metadata embedded in the multiple footages.

16. The post-production editing platform of claim 13, wherein the structure of the multiple temporal units specifies that a scene includes multiple shots, and wherein one or more clips from at least one device correspond to a same shot.

17. The post-production editing platform of claim 13, wherein the one or more processors are further configured to:
identify one or more characters or one or more gestures in the multiple footages; and
refine an alignment of the multiple footages based on the identified one or more characters or the identified one or more gestures.

18. The post-production editing platform of claim 17, wherein the semantic meaning comprises an association between locations of the one or more characters or actions performed by some of the one or more characters that is determined based on the video analysis of the multiple footages.

19. The post-production editing platform of claim 13, wherein the one or more processors are configured to:
extract text or background sound from the multiple footages based on the audio analysis; and
modify the script to include the text or the background sound.

20. The post-production editing platform of claim 13, wherein the one or more processors are configured to extract of the semantic meaning based on:
identifying one or more characters in the multiple footages;
identifying, based on the multiple footages, one or more actions performed by the one or more characters; and
establishing, using a neural network, an association between at least part of the one or more actions based on the information about the event.

21. The post-production editing platform of claim 20, wherein the one or more processors are configured to adjust the association between the at least part of the one or more actions using feedback from a user.

22. The post-production editing platform of claim 13, wherein the one or more processors are configured to package and distribute the edited multimedia content to one or more online media platforms.

23. The post-production editing platform of claim 13, wherein at least part of which is implemented as a web service.

24. The post-production editing platform of claim 13, wherein the one or more processors are configured to assign the time domain location to each of the multiple temporal units of the multiple footages based on metadata or audio data in the multiple footages.

25. The post-production editing platform of claim 13, wherein the one or more processors are configured to determine that multiple temporal units of the multiple footages are captured from different angles at substantially same time.

26. A multimedia content system, comprising:
an input device that stores multiple video footages of an event captured by multiple devices; and
one or more computer processors, computer servers or computer storage devices in communication with the input device via a network and configured to:
receive the multiple video footages of the event from the input device;
construct a script to indicate a structure of multiple temporal units of the multiple video footages based on information about the event, including a captured time of each of the multiple video footages at the event, wherein a temporal unit comprises a shot or a scene, wherein the one or more computer processors are configured to construct the script by;
determining the captured time for each of the multiple video footages based on metadata associated with each footage;
assigning a time domain location to each of the multiple temporal units of the multiple video footages using the captured time; and
aligning the multiple video footages based on the time domain location of each of the multiple temporal units of the multiple video footages such that temporal units captured around a same time are grouped together in the script; and
refining the structure of the multiple temporal units of the multiple video footages based on semantic meaning extracted from the multiple video footages using at least an audio analysis and a video analysis of the multiple video footages;
add editing instructions to the script based on the structure of the multiple temporal units to enable a transition between at least two of the temporal units captured around the same time;
perform editing operations based on the editing instructions to generate an edited multimedia content corresponding to the multiple video footages; and
provide, via the network, the edited multimedia content to be retrieved for viewing or further processing.

27. The multimedia content system as in claim 26, further comprising a communication or computing device in communication with the network to interact with the one or more computer processors, computer servers or computer storage devices to retrieve the edited multimedia content for viewing or further processing.

28. The multimedia content system as in claim 26, wherein the input device is operable to retrieve the edited multimedia content for viewing or further processing.

29. The multimedia content system as in claim 26, wherein the input device includes a computer.

30. The multimedia content system of claim 26, wherein the one or more computer processors are configured to determine that multiple temporal units of the multiple video footages are related to a same content and are captured from different angles at substantially same time.

* * * * *